March 14, 1939.  A. DRENKARD, JR  2,150,431

CAPACITY SELECTOR FOR CARRIER CONVEYER SYSTEMS

Filed May 27, 1935

INVENTOR
A. DRENKARD JR.

BY  Eugene C. Brown
ATTORNEY

Patented Mar. 14, 1939

2,150,431

UNITED STATES PATENT OFFICE 2,150,431

CAPACITY SELECTOR FOR CARRIER CONVEYER SYSTEMS

Adam Drenkard, Jr., Grantwood, N. J., assignor to The Western Union Telegraph Company, New York, N. Y., a corporation of New York Application May 27, 1935, Serial No. 23,765

12 Claims. (Cl. 243—16)

This invention relates to a conveyer system in which articles are transported along a conveyer path and selectively discharged at one or more points therealong. More particularly, the invention relates to a system in which carriers are employed for conveying the articles and in which means is provided for selectively discharging the carriers.

The principal object of this invention is to provide a system in which the carriers embody means for indicating and producing selective response in accordance with the station for which they are designated and which embody the minimum departure in physical dimensions from carriers employed in a similar system in which selective discharge is not employed.

It is well understood in the carrier conveyer art that the usefulness of a carrier conveyer line, such as a pneumatic tube or the like, is considerably increased by providing for carriers to be selectively discharged at intermediate points along the line instead of having to traverse the entire length of the line before leaving the same. In this manner a plurality of remote stations may be served from a single sending station. Various methods have been employed heretofore for accomplishing selective discharge. However, most of the systems which have been heretofore devised entail a considerable departure in the physical dimensions of the carriers, either externally or internally over that which is required in systems where only one remote station is to be served. These changes in dimension of the carrier either interfere with the size of the article which the carrier can admit or so change the external dimensions of the carrier that it could not satisfactorily be employed in a system designed and installed for conveying carriers not to be selectively discharged. Among other things this necessarily limits the application of selective discharge arrangements to new installations or to old installations in which use of substantially the entire space in the carriers previously employed has not been required.

It is another object of this invention therefore to provide a selective carrier discharge apparatus which may be applied to installations already in service without decreasing the capacity and usefulness of the system as previously operated.

It is another object of this invention to provide carriers to be employed in a selective discharge system in which the different characteristics necessary for designating the station to which the carrier is assigned and accomplishing the selective discharge of the carrier are provided by making changes in the composition of the carrier structure without appreciably altering the physical dimensions of the same.

In order to be able to provide a system such as outlined above, it is necessary to devise means, to be employed at each of the discharge points, capable of selective response to such carriers. This may be accomplished by employing an oscillation generator or similar device with some portion of its circuit or some one of its circuit elements disposed near the carrier path in such a manner that it will be influenced by the passage of a carrier so as to momentarily alter the characteristics of the generator circuit and cause the oscillations of the generator to be modified. The modified oscillations may be employed to initiate the action of discharge means, which in turn controls the discharge mechanism.

According to my copending application, Ser. No. 10,734, filed March 12, 1935, an inductance forming a portion of the generator circuit is disposed adjacent the carrier path in such a manner as to be influenced by the passage of the carrier. In accordance with this invention a capacitance or a capacity element of the circuit is disposed adjacent the carrier path to be influenced by the carrier.

It is therefore another object of this invention to provide an oscillation generator or the like for controlling the discharge of carriers from the conveyer path so arranged that carriers differing from each other, not in physical dimensions, but in other properties, such as conductive areas or the like, will affect or change the capacitance of the circuit.

When employing oscillation generators embodying electronic tubes or relays of the ordinary high vacuum type, there arises a problem of prolonging the response of the relays a sufficient time to permit the associated control mechanism to act. In order to provide for this the usual practice is to employ devcies having the characteristics of a locking relay or trigger operated device whose action is initiated by the relatively short period of response to the passage of a predetermined carrier, and which remains operated a sufficient time to permit the operation of the associated devices which are normally of the slow acting type. This necessarily complicates the apparatus and adds to the cost and service required for its upkeep.

It is a still further object of this invention to provide means for extending or prolonging the response of a selector or pick-up device to a carrier approaching a point at which it is to be discharged. According to this invention this may be accomplished by providing means for extending a capacitance element of a generator circuit along the carrier path from a point remotely in advance of the discharge to a point adjacent the discharge.

In the structure to be described more fully herein the pick-up device is preferably in the form of two or more capacitance elements or electrodes so disposed about the carrier path as to form condenser elements the capacity of which is influenced or changed when a carrier passes near the same. In the preferred form the carriers are provided with different areas of conductive surface incorporated in their body so that when they pass near the condenser elements the capacity of the condenser will be affected, which in turn so modifies the capacitance of the oscillation circuit as to initiate, dampen or otherwise modify the oscillations of the circuit.

Other objects of this invention will appear in the following description taken in connection with the accompanying drawing forming a part of this application, in which.

Figure 1:
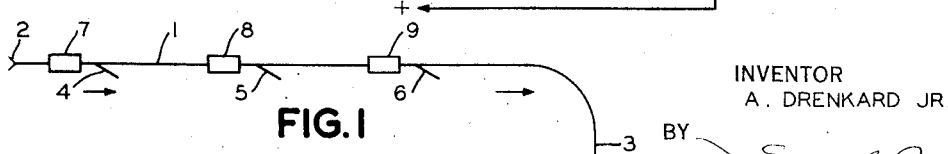
Fig. 1 is a diagrammatic view of a conveyer line having a plurality of intermediate discharge points.

Referring now to the drawing, Fig. 1 illustrates a conveyer system or line 1 extending between a sending station 2 and a remote station 3. In order that the line may serve to communicate with more than one point, intermediate branch points 4, 5 and 6 are provided, as illustrated. Carriers having suitable means thereon or distinguishing characteristics embodied therein, will be selectively discharged at a predetermined one of the points. Carriers not selected will be discharged at the distant point 3. The type of conveyer system or line employed may be either the one-way line illustrated or a closed or return line system in which unselected carriers are returned to the sending station.

In advance of each of the discharges or points where the carriers are to be deflected from the conveyer, selector means are provided which are selectively responsive to certain carriers for operating deflector means at the discharge point. The various deflection points 4, 5 and 6 are provided respectively with selector means 7, 8 and 9, each of which is set to respond to different carriers. For example, the selection at the first station is accomplished by the selective means 7 being set to respond only to carriers, such as carrier 4a illustrated in Fig. 5, having an all metal body. Carriers having lesser amounts of metal or metallic or conductive surface in their body than carrier 4a, do not cause the selecting mechanism to respond. Selector 8 at the deflection point 5 is set to respond to carriers having not less than half of their body composed of metallic material or embodying a metallic or conductive surface, such as carrier 5a illustrated in Fig. 6. Carriers having less than half of their body presenting a conductive surface do not cause the selector 8 to respond. Similarly, the selector 9 at the deflection point 6 is set to respond to a carrier having only a small portion of its body comprised of metal or presenting a small conductive surface, such as the carrier 6a illustrated in Fig. 7. Of course, carriers having no metal or no conductive surface incorporated in their body, such as carrier 7a illustrated in Fig. 8, do not cause the selector 9 to respond. Such carriers as the latter, therefore, are continued on and discharged at the distant station 3. It will be seen, therefore, that selective discharge of carriers from a conveyer path or guideway by providing selective means with suitable response sensitivity permits the employment of carriers having substantially the same physical dimensions as would be required where the carrier is intended for a simple system extending between two points only and in which selection is not involved.

Figure 2:
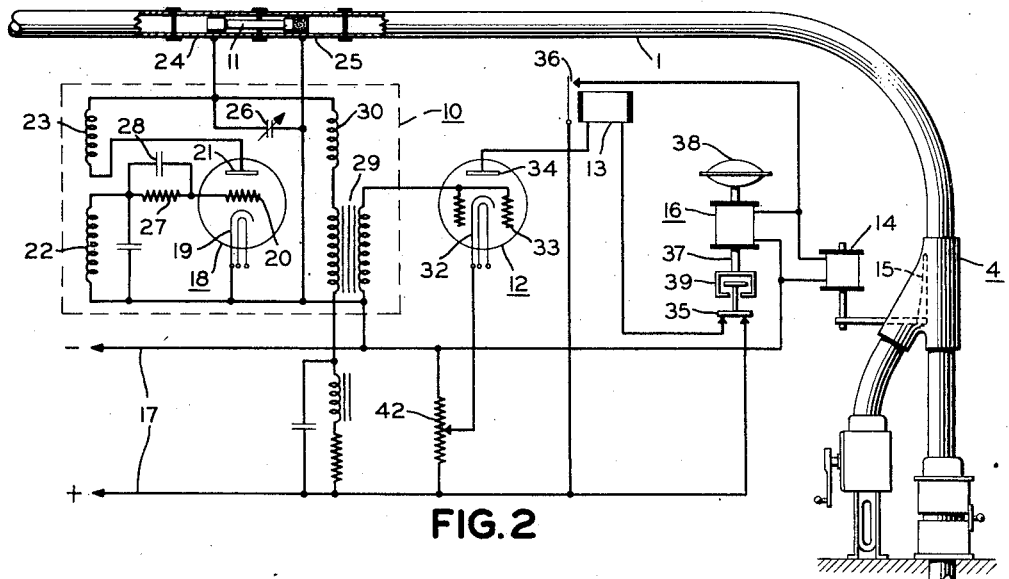
Fig. 2 is a diagrammatic illustration of a typical selector device arranged to operate a discharge deflector at an intermediate point.

Fig. 2 illustrates a typical unit at one of the discharge points. Each of the discharge points as shown in Fig. 1 is provided with a unit of this type and selection is obtained by a variation in the sensitivity or response of the unit. In other words, one of the units is set to respond to a carrier having one characteristic and another of the units is set to respond to a carrier having another characteristic. How these characteristics in the carriers are produced and the manner in which the various units are set to respond to particular carriers will be made apparent as the description proceeds.

The unit illustrated in Fig. 2 comprises an oscillation generator 10 which is arranged to respond to a carrier 11 passing along a section of the conveyer line 1 in advance of a deflection point 4. The oscillation generator is arranged to excite or trigger off a gaseous discharge tube 12 which in turn closes a relay 13, energizing solenoid 14, which throws the deflector member 15 into deflecting position. Once the tube 12 is energized, it remains energized, causing the deflector 15 to be held in discharge position until the plate circuit of the tube 12 is opened by means of a timer 16. The current may be provided for the various elements from a direct current source by leads 17.

The oscillation generator 10 may be of any well known type, the form shown being illustrative only. As illustrated the generator comprises a three element tube 18 provided with a cathode 19, a grid 20, and an anode 21. These elements are connected in a well known type of oscillation circuit which comprises a tuned inductance or coil 22 in the grid circuit, and a feed back coil 23 in the anode circuit inductively coupled to the grid circuit. The latter may be tuned or untuned.

In order to provide for pick-up means or means to cause the oscillator generator 10 to respond to a carrier traveling along the tube 1, longitudinally extending adjacent sections 24 and 25 of the conveyer tube, of a length not substantially less than the length of the conductive portion of the carrier to be selected, are insulated electrically from each other and from the rest of the conveyer tube 1 and connected in the generator circuit in a capacitance relation. These sections 24 and 25 acting together provide the pick-up or response means. It will be seen that there is very little capacity between their adjacent ends due to the small area at the ends. However, there will be considerable capacity between each of the sections 24 or 25 and a carrier 11, having a metallic body, when the carrier is present within the section. This characteristic alone does not provide the capacitative change between the sections to produce pick-up response. It is when the carrier 11 reaches a position within both sections that it forms a coupling link between the two sections by virtue of the fact that the metallic portion of the body extends from one section to the other and connects portions of the body which are at that moment capacitatively coupled to the sections in which the respective extremities of the carrier are lying. It will be seen that the carrier in passing through the adjoining capacitatively coupled pick-up sections will momentarily increase the capacity between the sections and in this manner increase the feedback and start oscillations in the generator 10. In order to bring the generator circuit to a point just below oscillation, a variable condenser 26 may be shunted across the sections 24 and 25 of the pick-up. The other portions of the circuit are in conventional form except as will now be noted.

The bias for the grid of the oscillator electron tube 18 may be provided as shown, that is, with a grid leak arrangement in which a resistance 27, shunted by a condenser 28, is in series with the grid or by the well known manner of inserting a resistance in the lead to the cathode 19 or any other suitable manner. It is also well known that different bias arrangements produce different operating characteristics both as to the amount of current passed by an electron tube in a state of oscillation compared with that passed when the tube is damped or not oscillating and the sensitivity or response of the oscillator to a specific circuit modifying medium. Any arrangement which produces the desired operating characteristic may be employed.

The anode circuit of the oscillator includes the primary of transformer 29. The arc discharge tube 12 is provided with a cathode 32, grid 33 and anode 34. The secondary of the transformer 29 is connected in circuit with the grid 33. The tube 12 is preferably of a well known vapor electric or arc discharge type, having a trigger operating characteristic. In other words, the discharge through the tube when once started by raising the potential of the grid to the breakdown point, continues independent of the subsequent potential on the grid until the anode potential is momentarily interrupted or cut off.

In series with the anode circuit of the arc discharge tube 12 is included the winding of relay 13 and the contact bar 35 of the timer 16. The winding of the timer 16 is in parallel with the winding of the deflector operating solenoid 14 and the circuits to both are completed by the closing of contacts 36 of relay 13. The contacts of timer 16 are normally closed and are opened after its winding has been energized for a predetermined time during which its stem 37 travels upwardly against the bellows or dashpot 38 until the yoke 39 lifts the bar 35 from its contacts.

Two principles of operation may be employed to provide the desired sensitivity or selective response of the apparatus. One of these is to so adjust the components of the oscillation circuit 10 as to set the circuit to operate at a different predetermined increase in feedback at each of the various deflection points. In other words, referring to Fig. 1, the feedback of the oscillator in selector 7 is adjusted relative to the peak point by such an amount that the oscillations are started only by a carrier having a complete metal body, while the selective means 8 is adjusted to a point nearer the feedback peak such that a carrier having a part metal body such as 5a would start the oscillations. In a similar manner the selector 9 would be set still nearer the feedback peak point. The surges of oscillation current, as readily understood, produce current pulses through the transformer 29 upon grid 33 to initiate the discharge of the tube 12. With the type of setting just described, the adjustment may be made to produce substantially the same current pulse in the transformer 29 so that the tube 12 in each of the selectors is set to be triggered off by pulses of substantially the same strength.

The other method of adjustment is to set the oscillator feedback of the several generator controls at substantially the same point so that carriers having different amounts of metal or conductive surface in their bodies will produce different degrees of oscillation of the generator. This will produce different current pulses in the transformer 29 in the various selectors, and these pulses may be employed to produce the selective quality by providing the grid 33 of the tube 12, by means of an adjustable resistance 42, with a different bias in each of the selectors. Thus the selector 7 could be provided with a large grid bias on the discharge tube 12 so that only the oscillations of the generator which are produced by the all metal body will be sufficient to initiate the discharge in tube 12. Similarly, by decreasing successively the amount of bias imposed upon the grids of the tube 12 of the selectors 8 and 9, proper response would be provided in each case.

The pickup sections 24 and 25 are placed ahead of the deflector or diverting member 15 a distance, relative to the speed of the carrier, such that sufficient time will elapse between the arrival of a carrier within the pickup zone and its arrival at the discharge point to permit the deflector member to move into discharge position across the path of the carrier tube 1. With standardized types of apparatus, this time will be something like one second.

Assuming that the carrier 11 is approaching; as it reaches the pickup, by virtue of the capacity effect of its conductive surface to the electrodes 24 and 25, as already explained, the feedback is suddenly increased. This causes a sudden change in the amount of current passed by the tube 18, causing a current pulse through the primary of the transformer 29. This pulse induces simultaneously a potential in the secondary of the transformer which is imposed upon the bias resistance 42. This will raise the potential of the grid 33 with respect to the cathode 32 of the tube 12 to a point which will permit the arc to form between the cathode and the anode 34. The current thus passing through the tube will energize relay 13 to close the contacts 36. This completes the circuit from the supply leads 17 to energize, simultaneously, the winding of the solenoid 14, cause its armature to pull up and move the deflector member about its pivot point to a position across the path of the carrier tube 1 and, also to energize the winding of the timer 16, causing a pull to be exerted upon the stem 37 against the dash pot 38. The discharge tube will continue to pass current until its anode circuit is opened at the timer contacts 35. During this time current is continuously supplied to the solenoid 14 and the timer 16. While the timer stem 37 travels upwardly, the solenoid will hold the deflector in discharge position, diverting the carrier into the branch or discharge section of the carrier tube. When the timer stem has raised to a point where the yoke 39 lifts the bar 35, the circuit to the discharge tube 12 will be opened, quenching the arc therethrough, and terminating the supply of current to the relay 13. This permits the contacts 36 to open, opening the current supply circuits to the windings of the solenoid 14 and timer 16. The armatures of these devices then drop back to their normal position, that of the solenoid opening the conveyer path and that of the timer closing the plate circuit to the arc discharge tube. The apparatus is now in condition for responding to the arrival of a subsequent carrier of the proper character to produce a response in the pickup of the oscillation generator. A similar action takes place in each of the selectors 7, 8 and 9, when carriers designated to be discharged or diverted at those points pass through the pickup zones of the respective oscillation generators.

Figure 3:
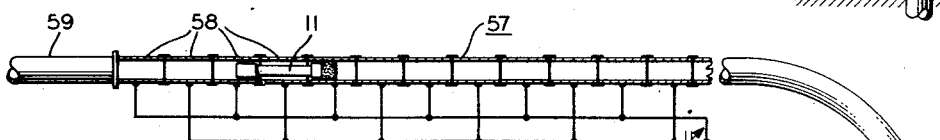
Fig. 3 is a diagrammatic illustration of a modification showing an arrangement for prolonging the response of the selecting mechanism at the discharge point.

Another form of selector and associated apparatus for operating the discharge deflector is shown in Fig. 3. This arrangement represents substantially the minimum amount of apparatus that can be employed according to the methods of this invention. According to this embodiment, the physical structure has been reduced to a single electronic device which operates both as the oscillation generator and the relay for supplying the operating current to the solenoid for operating the relay.

Specifically, the apparatus comprises a three element tube 51, preferably of the ordinary high vacuum or electron discharge type, or of any other type suitable to work in an oscillating circuit. In practice it will be found that a suitable tube may be had among the relatively inexpensive types. The tube may be of the three electrode type embodying a cathode 52, a grid 53 and an anode 54. The cathode and grid are connected through a suitably tuned circuit 55 and the anode and cathode are connected through a circuit which includes a feed-back 56 and a capacitative pickup 57. The pickup is shunted by a variable condenser 63, which may be used to vary the feedback to bring the circuit to a predetermined point, below oscillation. The pickup 57 in this instance is comprised of a series of insulated segments 58 which form a section of the carrier guideway 59. The multisectioned pickup is formed of cylindrical segments arranged end to end, alternate ones of which form opposite electrodes capacitatively coupling the anode and cathode circuits of the tube 51 the sections being of such length that the conductive portion of the carrier to be selected is never spanned by more than two complete sections. Also in the anode circuit is a portion of the winding of a split wound relay 61.

The other half of the winding of relay 61 forms a locking winding which is in series with solenoid 64 which is employed for moving the deflector member 65 into its operated position. When the relay 61 is energized it closes its tongue upon contact 66, thus completing a circuit through its locking winding and solenoid 64. This holds the circuit closed, and the solenoid operated, until carrier 11 opens the circuit, after having been deflected from the guideway 59 into branch 67, by striking the trigger device 68.

The operation of this arrangement may be set forth as follows: A carrier 11, proceeding along the guideway 59, approaches the branch point and passes into the portion of the guideway forming the pickup or response section 57. As the metallic carrier body bridges adjacent sections 58 it will capacitatively couple those sections increasing the feedback and causing the oscillation generator circuit to be brought into oscillation. With the circuit described an increase in the current flow through the tube 51 results. As the carrier proceeds along the section 57, the coupling between adjacent electrodes will vary between a maximum and minimum in accordance with the instantaneous position of the carrier. The constants of the circuit will be so worked out that the oscillations set up will not die down between the periods of maximum and minimum capacitance. This will result in a current flow sufficient to cause relay 61 to be operated even though the current passing therethrough is a fluctuating current.

The selective features of this arrangement are determined by the sections 58 being of such length that the carrier to which the generator at a particular point is to respond will have a length of conductive surface sufficient to provide a coupling area which will extend through each of the sections 58 an amount sufficient to prevent the coupling from reaching a zero value in going from one maximum through the minimum to the next maximum value. It has been found that such an arrangement responds readily to a carrier having at least the equivalent length of metallic or conductive surface, but does not respond to a carrier having a shorter conductive surface.

The oscillations in the generator having been set up for sufficient time to cause relay 61 to close its contact completes the circuit through the solenoid 64 as already described. This causes the deflector 65 to be moved across a path of the main guideway 59, deflecting the carrier into the branch guideway 67. It proceeds along the branch guideway until it strikes the trigger device 68 opening its contacts and restoring all of the mechanism to its normal rest position.

Figure 4:
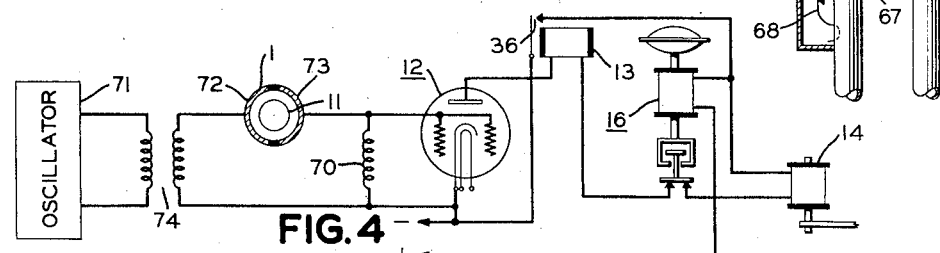
Fig. 4 shows a modified form of the pick-up or capacitance elements disposed about the carrier path.

Fig. 4 shows another modification of the invention, particularly of the form shown in Fig. 2. In Fig. 4 the complete structure is not shown; only enough details to make clear how the device is constructed and operated are included. There are two principal differences between this form and that of Fig. 2. The first of these is that instead of an oscillation generator in which its state of oscillation is changed when the device responds to a passing carrier, a generator 71 which is maintained continuously in a substantially constant state of oscillation is employed with means to vary the coupling between the generator and the vapor discharge tube 12 by the passage of a carrier. The variation of the coupling is accomplished by capacitative coupling through opposed sections of the carrier tube 1 disposed in the grid circuit of the vapor tube 12.

The second principal difference is that the capacitance in the section of tube 1 which provides the coupling, is formed by two opposed halves 72 and 73 of the tube separated and insulated from each other along an axial plane of the tube. In other words, the tube is split along an axial plane and insulating means inserted between the halves of the tube, which are of metal or other conductive material so that as the carrier passes between the opposed parts, the normal capacitance therebetween is varied. Selection is obtained substantially in the same manner as in connection with the foregoing embodiments, that is, by providing the tube sections at the respective discharge points of a length corresponding relatively to the length of the conductive surface of the carrier to be discharged therewith.

The oscillation generator 71 may be of any suitable type and may be coupled to the grid circuit of the vapor tube 12 by any suitable means such as transformer 74.

In this form of the invention the operation may be described as follows. The generator 71 will be continuously transmitting oscillations to the grid circuit of the vapor tube 12 but the coupling between the secondary of the transformer 74 and the grid of the tube will normally not be enough to trigger off or set up the discharge through the tube. However, when a carrier such as carrier 11 is present between the opposed halves 72 and 73 of the coupling tube section, the capacity between the sections will be increased sufficiently to cause an increased current flow through the secondary of transformer 74 and thereby an increased voltage drop across the choke 70 between the grid and cathode, sufficient to raise the voltage of the grid of the vapor discharge tube 12 to a suitable discharge value.

If desired, the constants of the grid circuit of tube 12 may be made such that the additional capacity provided by the presence of the carrier between the tube sections 72 and 73 will bring the circuit into resonance and sharply increase the voltage drop across the grid choke 70. When this happens, the current through the tube will energize relay 13 and close the circuit through the timer 16 and the solenoid 14 to operate a deflector member such as illustrated in Fig. 2 to discharge position. The carrier will then be discharged from the tube or guideway 1 and the mechanism restored to normal in the same manner as the mechanism already described in connection with the above mentioned figure.

Figure 5:
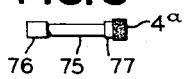
Figs. 5 to 8 are illustrations of different forms of carriers which are employed in this system.
Figure 6:
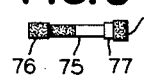

Referring particularly to the types of carriers which it is proposed to employ in the conveyer system described here, four types are illustrated in Figs. 5 to 8. These carriers may be made in substantially the same dimensions as carriers now employed in the systems which do not involve selective discharge and which utilize carriers of substantially identical construction. In constructing the carriers according to this invention two methods may be employed. One of these methods is by making the carrier body or a certain longitudinal portion thereof of metal or metallic material which will present a predetermined amount of conductive surface for influencing the amount of feedback as heretofore described. On the other hand the body may have applied thereto a metal foil or a conductive coating extending over a predetermined longitudinal portion of the body. As illustrated in Fig. 5, the carrier may be constructed of a metal tube 75 having collar 76 and cup 77 fitted thereon, also of metal. The cup 77 carries the usual fibre head or buffer member essential for high speed carriers. In Fig. 6 is illustrated a carrier having half of its body constructed to present a conductive surface. The simplest method of providing this arrangement is incorporating in one-half of the surface of the carrier a metal foil and constructing the carrier body of fibre in the well known manner. In this arrangement the tube 75 may be fibre with a metal foil encircling the half of the body adjacent the carrier head. Preferably the collar member 76 is likewise of fibre while the cup 77 will be metal.

Figure 7:
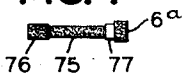

Fig. 7 shows another carrier in which only a small portion of the body presents a conductive surface. The simplest method of providing this is to make all of the carrier except the cup 77 of fibre, the cup being metal and providing the conductive surface.

Figure 8:
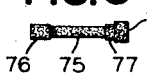

Fig. 8 illustrates an all fibre carrier which has substantially no conductive surface and to which none of the selecting mechanisms will respond. Obviously, in any of the carriers described, the conductive surface may be provided by any suitable type of conductive coating and is not necessarily limited to metal or metal foil.

From the above it will be seen that the system of selective carrier discharge constructed according to this invention may be readily applied to pneumatic carrier conveyer systems now in use and that carriers may be provided for the system having substantially the same physical dimensions as those at present employed. In this manner no elements will be introduced into the construction of the carrier which would limit its capacity for admitting the articles for which the original system was designed or which would interfere with the passage of the carriers through the curved or arcuate portions of the tubular guideway as now constructed. It is readily understood by those skilled in the art that there is a definite relation between the diameter and length of a carrier for use in a tubular guideway and the minimum radius of the arcs employed in installing the tubes where they change direction.

From the above description it will be seen that a conveyer system has been provided for selectively discharging carriers at intermediate points along a guideway embodied in simple, inexpensive and easily constructed apparatus which changes to a minimum degree a well known standard of practice at present employed in the art. It will also be seen that a novel method of selection has been provided which is easily applied to selectively discharge carriers in any type of conveyer system from their path of travel. It will further be seen that according to one embodiment of the invention, the apparatus required for accomplishing selective discharge had been reduced to the utmost simplicity making it easily applied to conveyer systems and requiring the minimum amount of supervision and upkeep.

Also according to this invention, a group of carriers has been provided with means for causing each of several carriers to be selectively diverted or discharged from the guideway at a predetermined point for which the carrier was intended with substantially no alteration of the physical dimensions of the carriers either internally or externally by merely substituting metallic parts or members for parts or members of a normally nonmetallic carrier of a previously devised standard design.

Another advantage of this invention is that a selective control system has been devised without employing any selection controlling element which protrudes or extends into the carrier tube or guideway.

While this invention has been shown in but three forms, it will be obvious to those skilled in the art that it is not so limited but susceptible to various other changes and modifications without departing from the spirit thereof, and it is desired, therefore, that only such limitations shall be placed thereon as are imposed by the prior art or as specifically set forth in the appended claims.

What I claim is:

1. In a carrier conveyer system, a carrier guideway, carrier selective means disposed at one or more points along the guideway for controlling the deflection of carriers therefrom, said selective means including a slow acting switching device comprising a deflector disposed in said guideway and a solenoid to actuate said deflector, and an electronic device in circuit with said solenoid for the operation thereof, capacitative means disposed along the guideway ahead of each slow acting switching device, and arranged so that carriers traveling along the guideway pass near the means, said means being coupled to the electronic device for producing a condition therein tending to operate said slow acting switching device in response to the presence of a passing carrier, said capacitative means being extended a substantial distance along the guideway so as to prolong the influence of the carrier on the electronic device for a sufficient time to permit the slow acting device to operate.

2. In a carrier conveyer system, a carrier guideway, carrier selective means disposed at one or more points along the guideway for controlling the deflection of carriers therefrom, said selective means including a slow acting switching device comprising a deflector disposed in said guideway and a solenoid to actuate said deflector, and an oscillation generator for energizing said solenoid, said generator being so arranged that changes in its oscillatory condition, which continue for a predetermined length of time, will operate said slow acting switching device, said generator embodying a control capacitance comprising electrodes disposed along the guideway so that as a carrier passes near the same the oscillatory condition of the generator is changed, said electrodes being extended along the guideway for such distance as to prolong the response of the generator to the carrier a sufficient time to permit the slow acting switching device to operate.

3. In a carrier conveyer system, a tubular carrier guideway, carrier selective means disposed at one or more points along the guideway for controlling the deflection of carriers therefrom, said selective means including a slow acting switching device comprising a deflector disposed in said guideway and a solenoid to operate said deflector, and an oscillation generator for energizing said solenoid, said generator being so arranged that changes in its oscillatory condition continuing for a predetermined length of time operate said slow acting switching device, said generator having associated therewith a control capacitance comprising a series of insulated sections of said tubular guideway alternately connected together and coupled in the generator circuit to form the electrodes of said capacitance so that as a carrier passes from one section to the other its instantaneous presence spans adjacent sections causing the capacitative coupling therebetween to be increased and changing the oscillatory condition of the generator, the number of said electrode sections employed being such as to extend said capacitance along the guideway a distance of such relation to the speed of the carrier as to prolong the response of the generator to the carrier a sufficient time to permit the slow acting switching device to operate.

4. In a carrier conveyer system embodying selective discharge means, a conveyer line and carriers for said line, said carriers having conductive surface areas to an extent differing in a lengthwise direction in accordance with the point at which they are to be discharged, carrier selective means comprising an oscillation generator arranged to be normally in a state of oscillation and having associated therewith a capacitance by means of which the oscillations of the generator may be damped, said capacitance having its electrodes disposed along said line in position for the capacitative coupling therebetween to be influenced by the passage of a carrier having a predetermined conductive surface area suitable for damping said generator in passing the electrodes of said capacitance and means responsive to said damping oscillations for controlling the path of the carrier's travel.

5. In a carrier conveyer system embodying selective discharge means, a conveyer line and carriers for said line, said carriers having conductive surface areas to an extent differing in a lengthwise direction in accordance with the point at which they are to be discharged, carrier selective means comprising an oscillation generator arranged to be normally not in a state of oscillation and having associated therewith a capacitance by means of which the generator may be brought into a state of oscillation, said capacitance having its electrodes disposed along said line in position for the capacitative coupling therebetween to be influenced by the passage of a carrier having a predetermined conductive surface area suitable for causing oscillations in said generator in passing the electrodes of said capacitance and means responsive to said initiation of oscillations for controlling the path of the carrier's travel.

6. In a carrier system, carriers, a tubular carrier guideway, carrier selective means disposed at one or more points along the guideway, corresponding deflective means to be operated by the selective means for effecting the deflection of carriers from the guideway, said selective means including an oscillation generator for operating the deflector means, said carriers being provided with conductive surface areas of a longitudinal extent differing in accordance with the different points at which they are designated to be deflected, each of said selective means embodying a capacitance comprising tubular sections of the guideway forming a part thereof and disposed end to end, insulated from each other, and coupled in the generator circuit to form the opposing electrodes of said capacitance, so that a carrier in passing through the portion of the guideway comprised of said electrodes modifies the capacitative coupling therebetween by an extent corresponding to the conductive surface area of the carrier, modifying the oscillatory condition of the generator a corresponding amount, said selective means at the respective points responsive to the modification of oscillations produced by carriers corresponding to the point for causing the selective means to operate the deflector at that point.

7. A carrier conveyer system according to claim 6 in which the tubular sections of the guideway comprising capacitance electrodes at the several points have lengths not substantially less than the longitudinal extent of the conductive surface area of the carrier to be discharged at that point.

8. In a conveyer system according to claim 6 in which the tubular sections of the guideway forming the capacitance electrodes at the several points along the guideway more than two in number and are of such lengths that the conductive surface area of the carriers to be discharged at that point are not spanned by more than two complete sections at any one time.

9. A carrier conveyer system comprising carriers provided with conductive surface areas of an extent varying lengthwise of the carriers, a guideway for said carriers and means for selectively diverting carriers from said guideway at a predetermined point in accordance with the conductive surface area thereof, said means embodying an electric circuit including electrodes forming a part of a length of said guideway and constituting a control condenser for said circuit, the electrostatic coupling between said electrodes being increased by the presence of a carrier to be selected for diversion to actuate said diverting means.

10. A carrier conveyer system comprising carriers provided with conductive portions of an extent varying lengthwise of the carriers, a guideway for said carriers and means for selectively diverting carriers from said guideway at a predetermined point in accordance with the extent of said conductive portions, said means embodying an electric circuit including electrodes forming a part of a length of said guideway and constituting a control condenser for said circuit, said electrodes being insulated from each other and from the rest of the guideway and disposed at opposite sides thereof, the conductive portions of the carriers being so positioned as to cooperate with said electrodes whereby the electrostatic coupling between said electrodes is increased by the presence of a carrier to be selected for diversion to actuate said diverting means.

11. A carrier conveyer system comprising carriers provided with conductive portions, a guideway for said carriers and means for selectively diverting carriers from said guideway at a predetermined point, said means embodying an electric circuit including electrodes forming a part of a length of said guideway and constituting a control condenser for said circuit, said electrodes being insulated from each other and from the guideway and consecutively disposed therealong, the electrostatic coupling between said electrodes being increased by the presence of a carrier to be selected for diversion to actuate said diverting means.

12. A carrier conveyer system having a conveyer line and means for selectively discharging carriers from the line, said means embodying an electric circuit including a control capacitance comprising control electrodes formed by tubular sections disposed end to end and insulated from each other and arranged to form part of a pneumatic conveyer tube comprising the line, so that a carrier passing the electrodes and having a predetermined conductive surface area affects the capacity of the electrodes in a manner to cause the discharge means to be operated.

ADAM DRENKARD, Jr.